United States Patent [19]

Wasley et al.

[11] 3,901,998

[45] Aug. 26, 1975

[54] HIGHLY FLUORINATED DERIVATIVES OF COPOLYMERS OF FLUOROALKYL ETHERS AND MALEIC ANHYDRIDE

[75] Inventors: William L. Wasley, Berkeley; Allen G. Bittman, El Cerrito, both of Calif.

[73] Assignee: The United States of America as represented by the Secretary of Agriculture, Washington, D.C.

[22] Filed: Aug. 22, 1974

[21] Appl. No.: 499,811

Related U.S. Application Data

[60] Division of Ser. No. 380,648, July 19, 1973, Pat. No. 3,876,589, which is a continuation-in-part of Ser. No. 271,894, July 14, 1972, Pat. No. 3,773,728, which is a division of Ser. No. 117,777, Feb. 22, 1971, Pat. No. 3,706,594.

[52] U.S. Cl. ............... 428/507; 427/390; 427/391; 427/392; 428/510; 428/511; 428/515
[51] Int. Cl.$^2$ .................................... D06M 15/16
[58] Field of Search ......... 117/121, 124 E, 126 AB, 117/138.8 F, 138.8 D, 138.8 N, 138.8 UA, 139.5 A, 141, 142, 143 A, 145, 155 UA, 161 UZ; 260/78.5 T

[56] References Cited

UNITED STATES PATENTS

| 3,645,990 | 2/1972 | Raynolds | 117/139.5 X |
| 3,686,281 | 8/1972 | Knell et al. | 117/139.5 X |
| 3,706,594 | 12/1972 | Wasley et al. | 117/155 X |
| 3,773,728 | 11/1973 | Wasley et al. | 260/78.5 T |

*Primary Examiner*—Michael R. Lusignan
*Attorney, Agent, or Firm*—M. Howard Silverstein; Max D. Hensley; William Takacs

[57] ABSTRACT

Copolymers of fluoroalkyl allyl (or methallyl) ethers and maleic anhydride are modified by conversion of anhydride units into acid fluoride groups or fluoroalkyl ester groups. These modified copolymers are useful for many purposes, including application to fibrous materials, e.g., textiles, to enhance their oil- and water-repellency.

14 Claims, No Drawings

HIGHLY FLUORINATED DERIVATIVES OF COPOLYMERS OF FLUOROALKYL ETHERS AND MALEIC ANHYDRIDE

A non-exclusive, irrevocable, royalty-free license in the invention herein described, throughout the world for all purposes of the United States Government, with the power to grant sublicenses for such proposes, is hereby granted to the Government of the United States of America.

This invention relates to and has among its objects the provision of novel polymers that are particularly useful for imparting oil- and water-repellent properties to fibrous materials. The objects of the invention also include procedures for treating fibrous materials with the polymers, and the treated materials as new articles of manufacture. Further objects of the invention will be evident from the following description wherein parts and percentages are by weight unless otherwise specified.

THE NOVEL COPOLYMERS

One aspect of the invention is the provision of novel copolymers of two distinct categories: I. Copolymers which contain acid fluoride groups and II, copolymers which contain ester groups.

The copolymers of category I contain:

a. recurring units of the structure

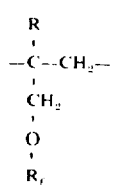

and b. recurring units of the structure

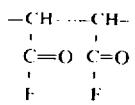

the aforesaid units a and b being in a 1:1 mole ratio.

The copolymers of category II contain:

a. recurring units of the structure

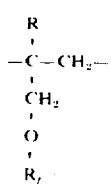

and b. recurring units of the structure

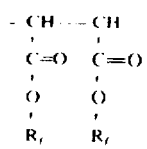

the aforesaid units a and b being in a 1:1 mole ratio.

In the aforesaid formulas (and throughout this document) R represents H or $CH_3$ and $R_f$ represents a fluoroalkyl radical which contains a terminal perfluoroalkyl group having 3 to 18 perfluorinated carbon atoms.

The perfluoroalkyl radical $(R_f)$ can be of an open-chain (acyclic) configuration, straight or branched. Alternatively, it may be of a cyclic structure such as a perfluorocyclohexyl group, or it may be a combination of acyclic and cyclic structures. Generally, the acyclic structures are preferred.

Representative examples of the fluoroalkyl radical $(R_f)$ are given below by way of illustration and not limitation:

$CF_3—(CF_2)_2—$
$CF_3—(CF_2)_4—$
$CF_3—(CF_2)_5—$
$CF_3—(CF_2)_6—$
$CF_3—(CF_2)_7—$
$CF_3—(CF_2)_9—$
$CF_3—(CF_2)_{11}—$
$CF_3—(CF_2)_{13}—$
$(CF_3)_2CF—$

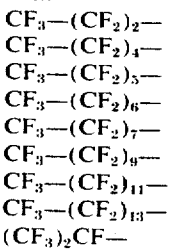

$CF_3—(CF_2)_2—CH_2—$
$CF_3—(CF_2)_3—CH_2—$
$CF_3—(CF_2)_{10}—CH_2—$
$CF_3—(CF_2)_9—(CH_2)_2—$
$CF_3—(CF_2)_7—(CH_2)_3—$
$CF_3—(CF_2)_7—(CH_2)_6—$
$CF_3—(CF_2)_7—(CH_2)_{12}—$
$(CF_3)_3C—$

A preferred embodiment of $R_f$ (in units a) is a radical of the category -

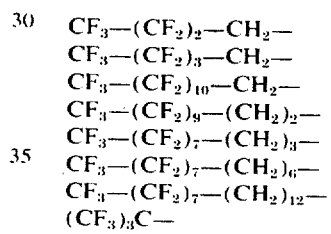

wherein $n$ is an integer from 0 to 7. Such radicals contain a fluorine group in alpha position, that is, on the secondary carbon (marked by an asterisk in the formula above) which is joined to the ether oxygen. The unique structure of these radicals provides the advantage that they confer a greater degree of oleophobicity for a given number of fluorinated carbon atoms than with other arrangements of fluorinated carbon atoms, for example, those in straight chains. In fact, our investigations have shown that 3 fluorinated carbon atoms in our arrangement provides a degree of olephobicity equivalent to 6 or 7 fluorinated carbon atoms in a straight chain or other configuration which lacks the critical alpha-fluoro configuration. A particularly preferred member of this category is the heptafluoroisopropyl radical $(CF_3)_2CF—$.

In the case of units b (in the copolymers of category II) it is preferred that $R_f$ be radicals which contain at least one methylene ($—CH_2—$) bridging group, that is, radicals of the type $C_xF_{2x+1}—(CH_2)_y—$ wherein $x$ is 3 to 18 and $y$ is 1 to 12. Such radicals in the ester groups of units b provide better stability than do radicals wherein the bridging group contains fluorine.

PREPARATION OF THE COPOLYMERS

In the preparation of the polymers of the invention we use as the starting material the copolymers disclosed in our U.S. Pat. No. 3,706,594, the disclosure of which is incorporated herein by reference. These starting materials are prepared by copolymerizing maleic anhydride with an equimolar amount of a fluoroalkyl allyl (or methallyl) ether of the structure

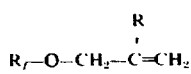

wherein R and $R_f$ are as herein defined.

These copolymerization products therefore contain -
a. recurring units of the structure

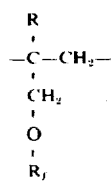

and
b. recurring units of the structure

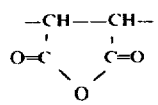

the said units a and b being a 1:1 mole ratio and R and $R_f$ being as herein defined.

Although complete directions for the preparation of the aforesaid copolymerization products are given in out U.S. Pat. No. 3,706,594, it may be of interest to provide the following summary: The comonomers—that is, the fluoroalkyl allyl (or methallyl) ether and maleic anydride—may be copolymerized under the influence of heat, light, or a combination of heat and light. The use of polymerization catalysts is preferred and for this purpose one may use peroxides such as benzoyl peroxide, acetyl peroxide, lauroyl peroxide, di-tert-butyl peroxide, or an azo initiator such as α,α'-azo-diisobutyronitrile or α,α'-azobis(α,γ-dimethyl-valeronitrile). Where the polymerization is conducted in solution, one may use fluorinated solvents, for example, benzotrifluoride, 1,3-bis-(trifluoromethyl)-benzene, trichlorotrifluoroethane, or the like. However, other (non-fluorinated) solvents such as benzene, toluene, xylene, etc. may be used. In carrying out the copolymerization in solution, temperatures of about 50°-100° C. are generally used. The copolymer products range from viscous liquids to semisolid or even solid materials. They are generally soluble in solvents such as acetone, methylethyl ketone, and in fluorinated solvents such as benzotrifluoride, 1,3-bis-(trifluoromethyl)-benzene, trichlorotrifluoroethane and the like.

In a preparation of the polymers of the invention (category I) the aforesaid copolymerization product of maleic anhydride and a fluoroalkyl allyl (or methallyl) ether is reacted with sulphur tetrafluoride ($SF_4$) which converts the anhydride portion of the starting polymer into acid fluoride groups. Thus -

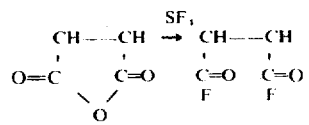

The reaction with $SF_4$ is carried out at elevated temperatures. Generally, temperatures in the range of 80°-200° may be employed; a preferred range is 100°-140° C. The reaction may be carried out in a sealed vessel either with or without solvent. As a solvent one may use such non-reactive diluents as benzotrifluoride, hexafluoroxylene, and the like.

In an alternative, but less preferred, method of preparing the acid fluoride-containing copolymers of the invention (category I), the following procedure is used. The copolymerization product of maleic anhydride and a fluoroalkyl allyl (or methallyl) ether is subjected to hydrolysis to convert the anhydride units

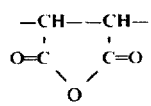

into carboxylic acid units

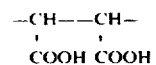

This can be accomplished, for example, by acidifying and refluxing a solution of the copolymerization product in acetone or the like. The resulting carboxylic-containing copolymer is then reacted with $SF_4$ as above described to yield the desired acid fluoride-containing copolymer.

In the preparation of the polymers of the invention (category II), the polymers of category I are used as intermediates. Thus, the polymer containing acid fluoride groups is reacted with an appropriate alcohol (or alcoholate) to convert the acid fluoride groups to ester groups. For this esterification we use an alcohol of the structure

wherein $R_f$ is as above defined. Alternatively, we can use the corresponding alcoholates of the structure $R_f$—OM wherein M is an alkali metal. If the alcohol is used, it is desirable to add a tertiary amine, such as triethylamine or pyridine, to the reaction mixture to absorb hydrogen fluoride as it is formed. In general, 1 mole of amine is used per equivalent of acid fluoride. The esterification is generally carried out in a non-reactive solvent such as benzotrifluoride or hexafluoroxylene. Usually the esterification is carried out at about room temperature for convenience. It is important to note that an alcoholate must be employed in situations whereby the esterification reagent has fluorine directly attached to the carbinol carbon atom. Thus, for example, one uses the alcoholate

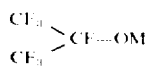

because the corresponding alcohol does not exist. Methods for preparing alcoholates useful in the synthesis of the instant polymers are described in our U.S. Pat. No. 3,465,050, the disclosure of which is incorporated herein by reference.

APPLICATIONS OF THE COPOLYMERS

The copolymers of the invention are useful in many areas, for example, as adhesives and coatings, textile sizes, binders and thickeners, etc. The high molecular-weight copolymers are useful for preparing filaments, films, foils, and shaped articles of all kinds. The copolymers are particularly useful for the treatment of fibrous materials, such as textiles, in order to enhance their oil-, water-, and soil-repellency and concomitantly to make it easier to remove stains if they should become stained. Moreover, these improvements are attained without detriment to other properties of the fibrous substrate. For example, the treatment does not impair the color, hand, or strength, of the substrate. Another point is that the improvements are durable; they are retained despite laundering and dry cleaning of the treated materials. In applications to enhance the water- and oil-repellency of fibrous materials, it is preferred to use the copolymers of category II, that is, the ones containing ester groups.

In applying the copolymer to a substrate, a typical procedure involves dissolving the copolymer in an inert volatile solvent, e.g., benzotrifluoride, 1,3-bis-trifluoromethyl benzene, trichlorotrifluoroethane, tetrahydrofuran, or acetone. The resulting solution is applied to the substrate by immersion, brushing, spraying, flooding, or the like. With textiles, conventional dip-and-pad techniques are preferred. By varying the concentration of copolymer in solution, the amount of copolymer deposited on the material may be varied. Typically, the amount of copolymer may be from 0.1 to 20%, based on the weight of fibrous material but it is obvious that higher or lower proportions can be used if desired. Usually, in treating textiles such as fabrics, the amount of copolymer is limited to about 0.1 to 5% to attain the desired repellency and soil release property without interference with the hand of the textile. In an alternative procedure, the copolymer is applied to the substrate, using water as the carrier for the copolymer. This is accomplished by forming an aqueous emulsion of the copolymer, using a conventional emulsifying agent to maintain the copolymer uniformly dispersed in the liquid. The emulsion is applied in any of the ways previously described and the amount of copolymer applied to the substrate is likewise as above.

After application of the copolymer, the treated substrate is subjected to a curing operation in order to bond the polymer to the fibers. As an example of such treatment, the fibrous material is heated in the range of about 50° to 100° C. for a period of 5 to 60 minutes. The carrier (from the copolymer solution or emulsion) may be evaporated in a separate step prior to curing or it may simply be evaporated during the curing operation.

In applying the copolymers of the invention to fibrous substrates, they may be accompanied by other substances, e.g., conventional finishing agents. Thus, a dispersion (i.e., solution, emulsion, or suspension) is made of an inert liquid carrier, the copolymer in accordance with the invention, and the additional substance which may be, for instance, a mothproofing agent, fungicide, coloring material, optical bleach, size, etc. The dispersion is applied and the treated fibrous material cured as disclosed previously. The inert liquid carrier may be water or any of the solvents described above.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts, or other nonwoven fabrics, garments or garment parts.

EXAMPLES

The invention is further demonstrated by the following illustrative examples.

The tests referred to in the examples were carried out as described below.

Water repellency: AATC spray test, Method 22–1952. Ratings are from 0 to 100, with the higher values signifying greater resistance to water penetration.

Oil repellency: The test used was the AATC Tentative Test Method 118–1966T. Ratings are from 0 to 8 with the higher values signifying the greatest resistance to oil penetration. In particular, the oil-repellency rating is the highest-numbered test liquid which will not wet the fabric within a period of 30 seconds. The liquids and their corresponding numbers are:

| No.: | |
|---|---|
| 1 | "Nujol" |
| 2 | 65.35 "Nujol"; n-hexadecane by vol. |
| 3 | n-Hexadecane |
| 4 | n-Tetradecane |
| 5 | n-Dodecane |
| 6 | n-Decane |
| 7 | n-Octane |
| 8 | n-Heptane |

EXAMPLE 1

Preparation of copolymer containing the following recurring units in essentially 1:1 mole ratio:

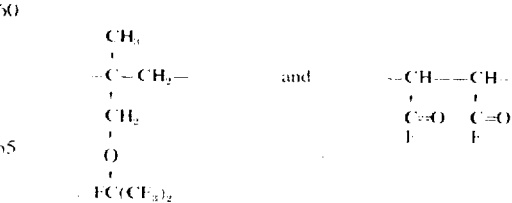

The starting material was the copolymer of heptafluoroisopropyl methallyl ether and maleic anhydride, prepared as described in U.S. Pat. No. 3,706,594.

A 75-ml. stainless steel vessel was charged with 5 g. of the starting material and 20 ml. of benzotrifluoride. The vessel was sealed, cooled in Dry Ice, and evacuated. Then, 10 g. of sulfur tetrafluoride was introduced therein. The vessel was resealed and placed in an oil bath at 135°C. for 84 hours. At the end of this period excess sulfur tetrafluoride was vented from the vessel and the contents were poured into a 200-ml polyethylene beaker. N-heptane was added to precipitate the polymer, which was recovered by filtration and redissolved in benzotrifluoride. N-heptane was again added to precipitate the polymer, which was recovered by filtration and dried in a vacuum oven at 80°C. and 1 mm. pressure. In this way 4.2 g. of a light brown, solid polymer was recovered.

Infrared analysis revealed the total disappearance of the carbonyl-anhydride absorption at 5.4 and 5.6 μ and the appearance of a strong carbonyl-acid fluoride band at 5.45 μ.

The polymer showed signs of softening at 125° C. The molecular weight was 46,000 and the fluorine content was 48.8%. (Calculated value 47.5%.)

The polymer was soluble in bis(1,3-trifluoromethyl)-benzene and benzotrifluoride, and was insoluble in polar solvents such as acetone and tetrahydrofuran.

EXAMPLE 2

Preparation of copolymer containing the following recurring units in essentially 1:1 mole ratio:

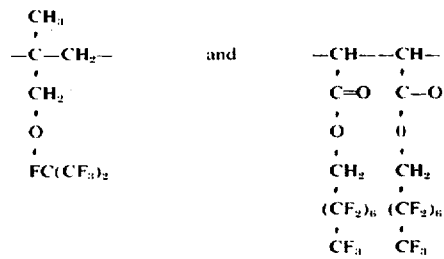

The starting material was the acid fluoride-containing copolymer prepared as in Example 1.

In a 50-ml. round-bottomed flask were placed 1 g. of the copolymer from Ex. 1, 3.8 g. of 1H,1H-pentadecafluorooctanol, and 10 ml. of 1,3-bis(trifluoromethylbenzene). To this mixture was added 0.8 g. of triethylamine. The solution was stirred and the slightly exothermic reaction was allowed to proceed for 1 hour, after which time the acid fluoride carbonyl absorption was no longer evident. The solution was washed twice with water, once with dilute potassium hydroxide, and finally once with water. The polymer was precipitated by addition of a 1:1 mixture of benzene and heptane. The light brown solid (1.5 g.) was dried under vacuum.

The polymer softened at 40°C. and had a molecular weight of 102,000. The polymer was soluble in 1,3-bis(trifluoromethyl) benzene and benzotrifluoride. The fluorine content was 59.8% (calculated value 62.7%).

EXAMPLE 3

Preparation of copolymer containing the following recurring units in essentially 1:1 mole ratio:

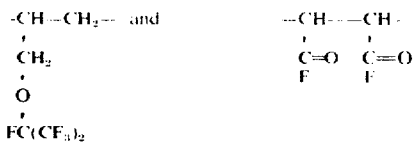

The starting material was the copolymer of heptafluoroisopropyl allyl ether and maleic anhydride, prepared as described in U.S. Pat. No. 3,706,594.

The starting material (1 g.) was dissolved in 10 ml. acetone to which 1 ml. of 12N-hydrochloric acid was added. The solution was refluxed for 5 days. Then, water was added to precipitate the product which exhibited a typical carboxylic acid absorption by IR analysis.

Calculated for F, 38.88%. Found: F, 38.48%.

The carboxylic copolymer product was reacted with sulphur tetrafluoride as described in Ex. 1. A dark-colored product was obtained, of which 72% consisted of the desired acid fluoride-containing copolymer which was soluble in benzotrifluoride and 28% consisted of a black powder insoluble in this solvent. The fluoride-containing copolymer was separated by extraction with benzotrifluoride; it was obtained as a light-gray material, soluble in benzotrifluoride and 1,3-bis(trifluoromethyl) benzene.

Analysis: Calculated for F, 49.42%. Found: F, 48.23%.

Average molecular weight, 17,000.

EXAMPLE 4

Preparation of copolymer containing the following recurring units in essentially 1:1 ratio:

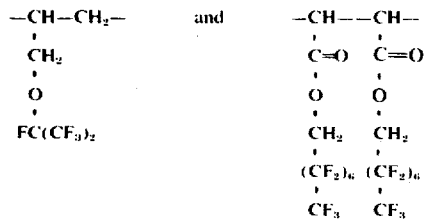

The acid fluoride-containing copolymer prepared in Example 3 was reacted with 1H,1H-pentadecafluorooctanol as described in Example 2.

A light-brown polymer was obtained. This polymer was rubbery at room temperature, indicating a softening point below 24° C.

Analysis: Calculated for F, 63.2%. Found: F, 63.4%.

Average molecular weight, 35,200.

EXAMPLE 5

Preparation of copolymer containing the following recurring units in essentially 1:1 mole ratio:

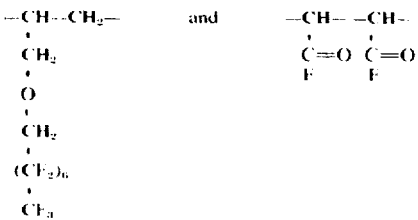

The starting material was the copolymer of 1H,1H-pentadecafluorooctyl allyl ether and maleic anhydride, prepared as described in U.S. Pat. No. 3,706,594. The said starting material was reacted with $SF_4$ as described in Example 1. The resulting acid fluoride-containing copolymer softened between 70° and 75° C.

Analysis: Calculated for F, 57.5 %. Found: F, 55.56%.

EXAMPLE 6

Preparation of copolymer containing the following recurring units in essentially 1:1 mole ratio;

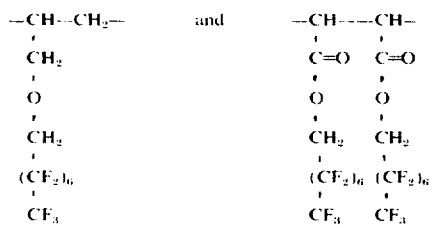

The acid fluoride-containing copolymer prepared in Example 5 was reacted with 1H,1H-pentadecafluorooctanol as described in Example 2. The resulting ester-containing copolymer was rubbery at room temperature.

Analysis: Calculated for F, 63.6 %. Found: F, 60.99%.

EXAMPLE 7

Preparation of copolymer containing the following recurring units in essentially 1:1 mole ratio:

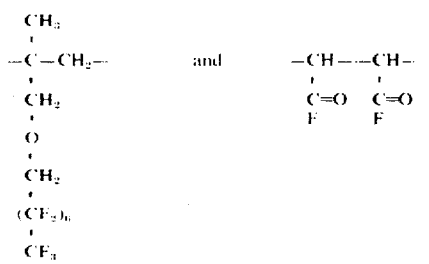

The starting material was the copolymer of 1H,1H-pentadecafluorooctyl methallyl ether and maleic anhydride, prepared as described in U.S. Pat. No. 3,706,594. The said starting material was reacted with $SF_4$ as described in Example 1. The resulting acid fluoride-containing copolymer softened at 80° to 85° C.

Analysis: Calculated for F, 56.27%. Found: F, 55.18%.

Molecular weight, 63,000.

EXAMPLE 8

Preparation of copolymer containing the following recurring units in essentially 1:1 mole ratio:

The acid fluoride-containing copolymer prepared in Example 7 was reacted with 1H,1H-pentadecafluorooctanol as described in Example 2. The resulting ester-containing copolymer softened at 60°–65° C.

Analysis: Calculated for F, 64.09%. Found: F, 61.44%.

Molecular weight, 139,000.

EXAMPLE 9: Application of the Copolymers to Textiles

The copolymers from Examples 1, 3, 4, 7, and 8 were dissolved in either benzotrifluoride or 1,3-bis(trifluoromethyl) benzene to form 1% solutions therein. These solutions were applied to fabrics, using the following technique.

A swatch of the fabric was wet out with the solution, squeezed in a roller until about 70% pick-up was obtained, air-dried, and cured in an oven at 140° C. for 2 minutes.

The treated fabrics and samples of the untreated fabric were then tested for oil-repellency and for water-repellency.

Two different fabrics were used in the tests: Undyed wool (worsted) and undyed cotton.

The results obtained are tabulated below.

| Copolymer | Treatment of Wool Fabric | |
|---|---|---|
| | Oil-repellency | Water-repellency |
| Example 1 | 2 | 100 |
| " 3 | 3 | 100 |
| " 4 | 7 | 100 |
| " 7 | 5 | 100 |
| " 8 | 8 | 100 |
| None (control) | 0 | 0 |

| Copolymer | Treatment of Cotton Fabric | |
|---|---|---|
| | Oil-repellency | Water-repellency |
| Example 1 | 2 | 100 |
| " 3 | 3 | 100 |
| " 4 | 6 | 100 |
| " 7 | 4 | 100 |
| " 8 | 7 | 100 |
| None (control) | 0 | 0 |

EXAMPLE 10: Measurement of Wettability

For this experiment the copolymers of Examples 1, 7, and 8 were dissolved in benzotrifluoride to a concentration of 1%. Clear glass microslides were immersed in this solution and slowly withdrawn, thereby coating the slides with a thin layer of polymer. The slides were heated at 110° C. for 20 minutes and were allowed to stand at ambient temperature for at least 1 hour.

Wettability was determined by measurement of the critical surface tension ($\gamma_c$) as follows: After the coated slides were cooled, contact angle measurements were made of droplets of a homologous series of n-alkanes ($C_{6-12}$, $C_{14}$, and $C_{16}$) applied to the treated slides.

The contact angle is a measure of the repellency of the polymer. The larger the contact angle, the more repellent the polymer is to the test liquid. Cosines of contact angles were plotted against liquid surface tensions and the plot extrapolated to cosine $\theta = 1$ ($0°$ contact angle) to give $\gamma_c$. Low values for $\gamma_c$ indicate low wettability and are, therefore, desirable.

Values for $\gamma_c$ for the aforesaid copolymers are tabulated below. For purposes of comparison $\gamma_c$ for Teflon (polytetrafluoroethane) is included.

| Copolymer | $\gamma_c$ (dynes/cm.) |
|---|---|
| Example 1 | 17.0 |
| " 7 | 14.9 |
| " 8 | 8.8 |
| Teflon | 18.8 |

Having thus described our invention, we claim:

1. A process for modifying a fibrous substrate, which comprises:
   A. depositing on the fibrous substrate an addition copolymer which contains
      a. recurring units of the structure

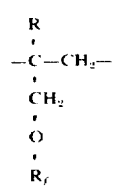

wherein R is a member of the group consisting of H and $CH_3$, and $R_f$ is a fluoroalkyl radical which contains a terminal perfluoroalkyl group having 3 to 18 perfluorinated carbon atoms, and
   b. recurring units of the structure

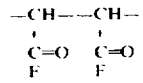

the aforesaid units a and b being in a 1:1 mole ratio;
   B. the said copolymer being deposited as a dispersion in a volatile liquid carrier; and
   C. curing the so-treated fibrous substrate by heating it at a temperature about from 50° to 150° C.

2. The process of claim 1 wherein $R_f$ is

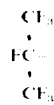

3. The process of claim 1 wherein $R_f$ is $$CF_3(CF_2)_6—CH_2—$$

4. As an article of manufacture, fibrous material carrying a deposit of an addition copolymer which contains
   a. recurring units of the structure

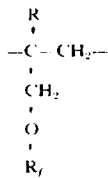

wherein R is a member of the group consisting of H and $CH_3$, and $R_f$ is a fluoroalkyl radical which contains a terminal perfluoroalkyl group having 3 to 18 perfluorinated carbon atoms, and
   b. recurring units of the structure

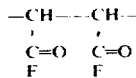

the aforesaid units a and b being in a 1:1 mole ratio.

5. The article of claim 4 wherein $R_f$ is

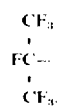

6. The article of claim 4 wherein $R_f$ is $$CF_3—(CF_2)_6—CH_2—$$

7. A process for modifying a fibrous substrate, which comprises:
   A. depositing on the fibrous substrate an addition copolymer which contains
      a. recurring units of the structure

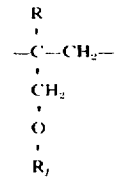

wherein R is a member of the group consisting of H and $CH_3$, and $R_f$ is a fluoroalkyl radical which contains a terminal perfluoroalkyl group containing 3 to 18 perfluorinated carbon atoms, and
   b. recurring units of the structure

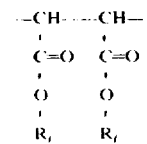

wherein $R_f$ is as above defined, the aforesaid units a and b being in a 1:1 mole ratio;
   B. the said copolymer being deposited as a dispersion in a volatile liquid carrier; and
   C. curing the so-treated fibrous material by heating it at a temperature about from 50° to 150° C.

8. The process of claim 7 wherein $R_f$ in units a is

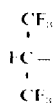

9. The process of claim 7 wherein $R_f$ in units a is $$CF_3-(CF_2)_6-CH_2-$$

10. The process of claim 7 wherein $R_f$ in units b is $$CF_3-(CF_2)_6-CH_2-$$

11. As an article of manufacture, fibrous material carrying a deposit of an addition copolymer which contains a. recurring units of the structure

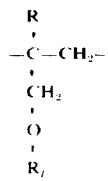

wherein R is a member of the group consisting of H and $CH_3$, and $R_f$ is a fluoroalkyl radical which contains a terminal perfluoroalkyl group having 3 to 18 perfluorinated carbon atoms, and b. recurring units of the structure

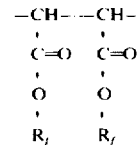

wherein $R_f$ is as above defined, the aforesaid units a and b being in a 1:1 mole ratio.

12. The article of claim 11 wherein $R_f$ in units a is

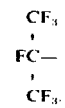

13. The article of claim 11 wherein $R_f$ in units a is $$CF_3-(CF_2)_6-CH_2-$$

14. The article of claim 11 wherein $R_f$ in units b is $$CF_3-(CF_2)_6-CH_2-$$

* * * * *

UNITED STATES PATENT OFFICE
CERTIFICATE OF CORRECTION

PATENT NO. : 3,901,998
DATED : August 26, 1975
INVENTOR(S) : William L. Wasley and Allen G. Pittman It is certified that error appears in the above-identified patent and that said Letters Patent are hereby corrected as shown below:

[75] Inventors: William L. Wasley, Berkeley; Allen G. Pittman, El Cerrito, both of Calif.

Signed and Sealed this sixteenth Day of December 1975

[SEAL]

Attest:

RUTH C. MASON
*Attesting Officer*

C. MARSHALL DANN
*Commissioner of Patents and Trademarks*